United States Patent
Degauque et al.

(10) Patent No.: US 8,843,065 B2
(45) Date of Patent: Sep. 23, 2014

(54) METHOD AND DEVICE FOR MANAGING INFORMATION EXCHANGE BETWEEN FOR EXAMPLE A NFC CONTROLLER AND A SET OF AT LEAST TWO SECURE ELEMENTS

(75) Inventors: Laurent Degauque, Fuveau (FR); Jürgen Böhler, Munich (DE); Alexandre Charles, Auriol (FR); Pierre Rizzo, Trets (FR)

(73) Assignees: STMicroelectronics (Rousset) SAS, Rousset (FR); STMicroelectronics Design and Application GmbH, Grasbrunn (DE)

( * ) Notice: Subject to any disclaimer, the term of this patent is extended or adjusted under 35 U.S.C. 154(b) by 400 days.

(21) Appl. No.: 13/281,635

(22) Filed: Oct. 26, 2011

(65) Prior Publication Data

US 2012/0108169 A1 May 3, 2012

(30) Foreign Application Priority Data

Oct. 27, 2010 (EP) .................................. 10306177

(51) Int. Cl.
| | | |
|---|---|---|
| H04B 7/00 | (2006.01) | |
| G06K 19/00 | (2006.01) | |
| H04B 5/00 | (2006.01) | |
| G06K 7/10 | (2006.01) | |
| H04W 12/00 | (2009.01) | |
| G06K 7/00 | (2006.01) | |
| G06F 21/00 | (2013.01) | |

(52) U.S. Cl.
CPC *H04B 5/00* (2013.01); *G06K 19/00* (2013.01); *G06K 7/10247* (2013.01); *H04W 12/00* (2013.01); *G06K 7/0008* (2013.01); *G06F 21/00* (2013.01)
USPC .......... 455/41.2; 455/141; 455/3.06; 235/492

(58) Field of Classification Search
CPC . H04W 88/02; H04W 12/06; H04W 52/0254; H04W 52/0274; G06K 7/10237; G06K 7/0008; G06K 19/07732
USPC ........ 455/41.2, 141, 3.06, 13.4, 127.4, 343.1; 235/492, 486
See application file for complete search history.

(56) References Cited

U.S. PATENT DOCUMENTS 6,424,820 B1 7/2002 Burdick et al. ................. 455/41
8,620,271 B2 * 12/2013 Tan et al. ...................... 455/411

(Continued)

FOREIGN PATENT DOCUMENTS

WO 2009/030472 3/2009 ................ H04L 7/08

OTHER PUBLICATIONS

"Smart cards; UICC-CLF interface; Physical and logical characteristics," ETSI TS XXX YYY, ETSI Standards, Sophia Antipolis Cedex, France, vol. 0.8.0, Jun. 1, 2007, pp. 1-52.

(Continued)

Primary Examiner — Minh D Dao
(74) Attorney, Agent, or Firm — Allen, Dyer, Doppelt, Milbrath & Gilchrist, P.A.

(57) ABSTRACT

The device may include a contactless element and a set of least two auxiliary elements. Each auxiliary element may include a slave SWP interface connected to a same master SWP interface of the contactless element through a SWP link, and a management module configured for activating at once only one slave SWP interface on the SWP link.

29 Claims, 8 Drawing Sheets

(56) References Cited

U.S. PATENT DOCUMENTS

| | | | |
|---|---|---|---|
| 2008/0121687 A1 | 5/2008 | Buhot | 235/375 |
| 2008/0144650 A1* | 6/2008 | Boch et al. | 370/464 |
| 2010/0207742 A1* | 8/2010 | Buhot et al. | 340/10.51 |
| 2013/0040566 A1* | 2/2013 | Mourtel et al. | 455/41.1 |
| 2013/0270349 A1* | 10/2013 | Lepp et al. | 235/492 |

OTHER PUBLICATIONS

"Smart cards; Vocabulary for Smart Card Platform specification," ETSI TR 216, ETSI Standards, Sophia Antipolis Cedex, France, vol. 3.0.0, Sep. 2003, pp. 1-19.

"Smart Cards; UICC-Contactless Front-end (CLF) Interface; Part 1: Physical and data link layer characteristics," Sophia Antipolis Cedex, France, vol. 7.3.0, Sep. 2008, pp. 1-57.

* cited by examiner

FIG.15

METHOD AND DEVICE FOR MANAGING INFORMATION EXCHANGE BETWEEN FOR EXAMPLE A NFC CONTROLLER AND A SET OF AT LEAST TWO SECURE ELEMENTS

FIELD OF THE INVENTION

The present disclosure relates to the communication between components, in particular, between a contactless element, for example, a Near Field Communication (NFC) controller element and at least two auxiliary elements, such as a Universal Integrated Circuit Card (UICC) or secure elements located within a wireless apparatus.

BACKGROUND OF THE INVENTION

As defined within ETSI TR 102 216 V3.0.0 (2003-09), UICC designates a smart card that conforms to the specifications written and maintained by the ETSI Smart Card Platform project. Further to its typical telephone function, a mobile phone may be used for exchanging information with a contactless device by using a contactless communication protocol.

This permits the exchange of information between the contactless device and elements located within the mobile phone. Many applications are possible, such as mobile ticketing in public transport (the mobile phone acts as a boarding pass) or mobile payment (the mobile phone acts as a debit/credit payment card).

NFC is a short range high frequency wireless communication technology that enables an exchange of data between two contactless devices over a short distance, for example, 10 centimeters. NFC is an open platform technology and is standardized in ISO/IEC 18092 and ISO/IEC 21481, but incorporates a variety of pre-existing standards including ISO/IEC 14443 protocol type A and type B.

Mobile phone manufacturers are interested in connecting two different auxiliary elements to NFC chips. This is because having two separate auxiliary elements may allow for clear separation of applications coming from different issuers (banks, transport operators, telephone operators, etc.).

ETSI TS 102 613 is a standard disclosing, in particular, the principle of a so-called Single Wire Protocol (SWP). The SWP is a bit oriented point-to-point communication protocol between a contactless front end, for example, a NFC controller, and a UICC. However, this single wire protocol, as defined in ETSI TS 102 613, may permit only communication between one contactless element, for example, one NFC controller, and one UICC.

A first approach for managing information exchange between a NFC controller and two elements includes providing a NFC controller with one SWP interface for secure elements based on SWP-UICC technology and a second interface (for example, a NFC Wired Interface: NFC-WI) for proprietary secure elements. However, such approach makes the design of a NFC controller more complex as an additional interface has to be managed in a time critical environment.

A second approach includes offering NFC controllers provided with two SWP interfaces. This approach would allow using two secure elements provided with SWB-UICC technology but again, it may make the design of the NFC controller more complex as an additional interface has to be managed.

SUMMARY OF THE INVENTION

According to an embodiment, a method and a device are for managing in a simple way, an information exchange between a contactless element, such as NFC controller, and several (at least two) auxiliary elements.

According to an aspect, a method of managing an information exchange between a main element, in particular, a contactless element, for example, a NFC element, such as a NFC controller, and a set of auxiliary elements is provided and may comprise providing each auxiliary elements with a slave SWP interface, connecting each slave SWP interface to a same master SWP interface of the main element through a SWP link, and activating at once, only one slave SWP interface on the SWP link.

A slave SWP interface is considered to be activated when, for example, it is capable, after an activation phase including transmission of particular control data, to exchange information with the master interface on the SWP link related to a particular contactless application. Thus, according to an embodiment, at least two secure elements are connected to one single SWP interface of the NFC controller. Both secure elements are thus able to listen to and analyze SWP frames sent by the NFC controller, but only one of the secure elements is active at the same time and is responding to SWP frames sent by the NFC controller. Each other secure element is in inactive state listening to and analyzing SWP frames sent by the NFC controller to identify one specific activation SWP frame which activates this secure element.

According to an embodiment, the method may comprise maintaining a slave SWP interface different from the activated slave SWP interface in an inactive state until the different slave SWP interface is activated in turn. An inactive state, in contrast with an activated state, is a state in which, for example, a slave interface remains silent on the SWP link while only listening to and analyzing the frames transmitted on the SWP link. According to an embodiment, the activating may comprise allowing each slave SWP interface to listen the SWP link, sending from the master SWP interface a selection frame on the SWP link including an identification of the slave SWP interface to be activated, and allowing only the slave SWP interface to be activated to respond to the selection frame, each other slave SWP interface remaining silent. According to an embodiment, allowing only the slave SWP interface to be activated to respond to the selection frame comprises sending on the SWP link from the slave SWP interface to be activated an identification control frame including the identification of the SWP interface to be activated.

According to an embodiment, the activating may further comprise after the slave SWP interface to be activated has responded to the selection frame, sending from the master SWP interface to the slave SWP interface to be activated, a power control frame including a power mode indication, and sending in response from the SWP interface to be activated to the master SWP interface a control frame indicating the SWP interface is ready for exchanging information according to the Single Wire Protocol. Activating another slave SWP interface may comprise first deactivating the current activated slave SWP interface and then sending to the another slave SWP interface to be activated the selection frame associated to the another slave SWP interface. According to this embodiment, deactivating the current activated slave interface may be obtained by physically placing the SWP link in a deactivated state according to ETSI TS 102 613.

Alternatively, activating another slave SWP interface may comprise sending to the another SWP interface to be activated the selection frame associated to the another slave SWP interface. With such a variant, sending the new selection frame permits deactivation of the current slave SWP interface without physically placing the SWP link in a deactivated state.

According to an embodiment, the activating may comprise not allowing a slave SWP interface to respond to a corrupted selection frame and allowing the master SWP interface to again send a selection frame. All the auxiliary elements may operate either in a full power mode or in a low power mode. Alternatively, at least one auxiliary element may operate in a full power mode and the other auxiliary elements may operate either in a full power mode or in a low power mode.

According to another aspect, a device may comprise a main element, and a set of at least two auxiliary elements, each auxiliary element including a slave SWP interface connected to a same master SWP interface of the NFC element through a SWP link and management means or a management module configured for activating at once, only one slave SWP interface on the SWP link. According to an embodiment, the management module may comprise main management means or a main management module located within the main element and configured to send a selection frame on the SWP link including an identification of the slave SWP interface to be activated, and auxiliary management means or an auxiliary management module located within each auxiliary element and configured to allow each slave SWP interface to listen the SWP link, and to allow only the slave SWP interface to be activated to respond to the selection frame, each other slave SWP interface remaining silent.

According to an embodiment, the auxiliary management module of the slave SWP interface to be activated may be configured to send on the SWP link an identification control frame including the identification of the SWP interface to be activated. According to an embodiment, the main management module may be further configured to send to the slave SWP interface to be activated, after the slave SWP interface to be activated has responded to the selection frame, a power control frame including a power mode indication, and the auxiliary management module of the slave SWP interface to be activated may be further configured to send to the master SWP interface a control frame indicating the SWP interface is ready for exchanging information according to the SWP.

According to an embodiment, the main management module may be further configured to first deactivate the current activated slave SWP interface and then send to another slave SWP interface to be activated the selection frame associated to the another slave SWP interface, for activating in turn the another slave SWP interface. According to an embodiment, the main management module may be further configured to send to another slave SWP interface to be activated the selection frame associated to the another slave SWP interface, for activating in turn the another slave SWP interface.

According to an embodiment, the auxiliary management module may be further configured to not allow a slave SWP interface to respond to a corrupted selection frame, and the main management module may be further configured to allow the master SWP interface to send again a selection frame. According to an embodiment, the device may further comprise control means or a controller configured to let all the auxiliary elements operate either in a full power mode or in a low power mode.

According to another embodiment, the device comprises control means or a controller configured to let at least one auxiliary element operate in a full power mode and the other auxiliary elements operate either in a full power mode or in a low power mode. According to another aspect, an apparatus may comprise an antenna and a device as defined above coupled to the antenna. The apparatus may be a wireless communication apparatus such as a mobile phone.

According to another aspect, an element, for example, a contactless element such as a NFC controller, is proposed comprising a master SWP interface configured to be connected to at least two slave SWP interfaces of respectively at least two auxiliary elements through a SWP link, and a main management module configured to deliver on the SWP link a selection information containing an identification of one of the auxiliary elements to be activated on the SWP link.

According to another aspect, an element, for example a secure element, may comprise a slave SWP interface configured to be connected to a master SWP interface of a master element through a SWP link, and an auxiliary management module configured to allow the slave interface to send on the SWP link an identification information containing an identification of the element only in response to a selection information containing the identification of the element received by the slave interface. According to another aspect, a wireless apparatus may include a device comprising at least two auxiliary elements, each having a SWP interface connected to a same SWP interface of a contactless element through a SWP link.

BRIEF DESCRIPTION OF THE DRAWINGS

Other advantages and features of the present disclosure may appear on examining the detailed description of embodiments, these being no way limiting, and of the appended drawings in which.

DETAILED DESCRIPTION OF THE PREFERRED EMBODIMENTS

Embodiments of the present disclosure will be now described in the technical field of contactless elements or components connected to secure elements, in particular, embedded in a mobile phone, although the present disclosure is not limited to these particulars embodiments. A contactless element is an element or a component able to exchange information through an antenna with a contactless device according to contactless communication protocol. A NFC element or component, which is a contactless element, is an element or component compliant with the NFC technology.

Figure 1:
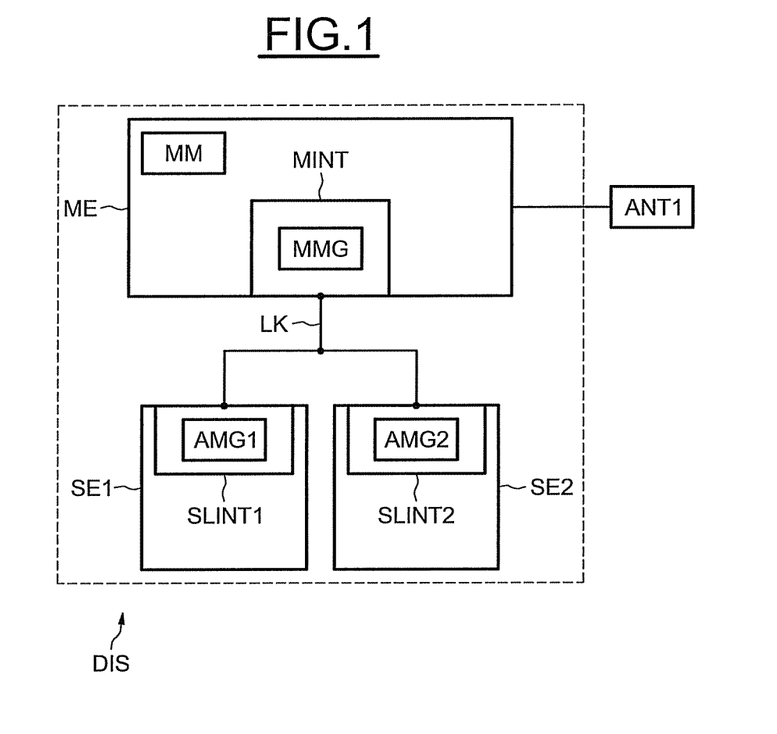
FIG. 1 is a schematic diagram of an embodiment of a device, according to the present invention.

In FIG. 1, an example of a device DIS according to the present disclosure is illustrated which comprises a contactless front end element ME, for example, a NFC controller, having a SWP interface MINT. The device also comprises two auxiliary elements or secure elements. Each secure element SE1 (SE2) comprises a SWP interface SLINT 1 (SLINT 2). Each SWP interface SLINTi is connected to the same SWP interface MINT of the NFC controller ME through a SWP link LK.

A secure element is, for example, an element adapted to contain secure or protected information, for example, banking information, information related to telephone subscription. Each SWP interface SLINTi comprises an auxiliary management module AMGi while the SWP interface MINT of the NFC controller ME comprises a main management module MNG.

Each secure element has a unique identification information called SYNC_ID, and the NFC controller ME comprises memory means (memory module) MM for storing all the identification information of all the secure elements connected to the NFC controller. The NFC controller ME is coupled to an antenna ANT1 for exchanging information with a contactless reader by using a contactless communication protocol, for example, the one disclosed in ISO/IEC 14443.

The SWP is a bit oriented, point-to-point communication protocol between a secure element and a contactless front end, and is specified in the standard ETSI TS 102 613, for example, the version V7.7.0 (2009-10) thereof. The person skilled in the art could refer if necessary to this document, and the contents thereof are hereby incorporated by reference in their entirety.

Figure 2:
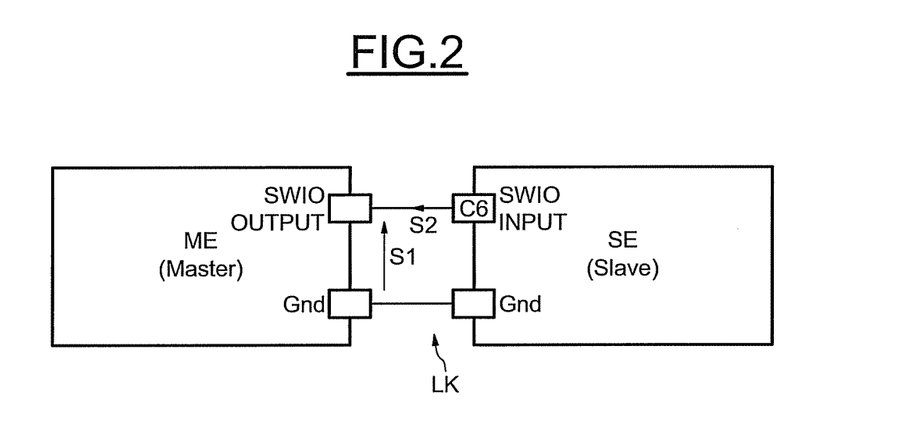
FIGS. 2 and 3 illustrate connections between a main element and auxiliary elements through a SWP link, according to the present invention.

More precisely, as illustrated in FIG. 2, the NFC controller ME is the master whereas a secure element SE is a slave. The master and a slave are mutually connected through a SWP link LK. As disclosed in ETSI TS 102 613, the principle of the SWP is based on the transmission of digital information in full duplex mode. The signal S1 from ME to SE is transmitted by a digital modulation (L or H) in the voltage domain whereas the signal S2 from SE to ME is transmitted by a digital modulation (L or H) in the current domain.

When the master sends S1 as state H, then the slave may either draw a current (state H) or not (state L), and thus transmits S2. With pulse width modulation bit coding of S1, it is possible to transmit a transmission clock, as well as data in full duplex mode. More details can be found in ETSI TS 102 613.

Figure 3:
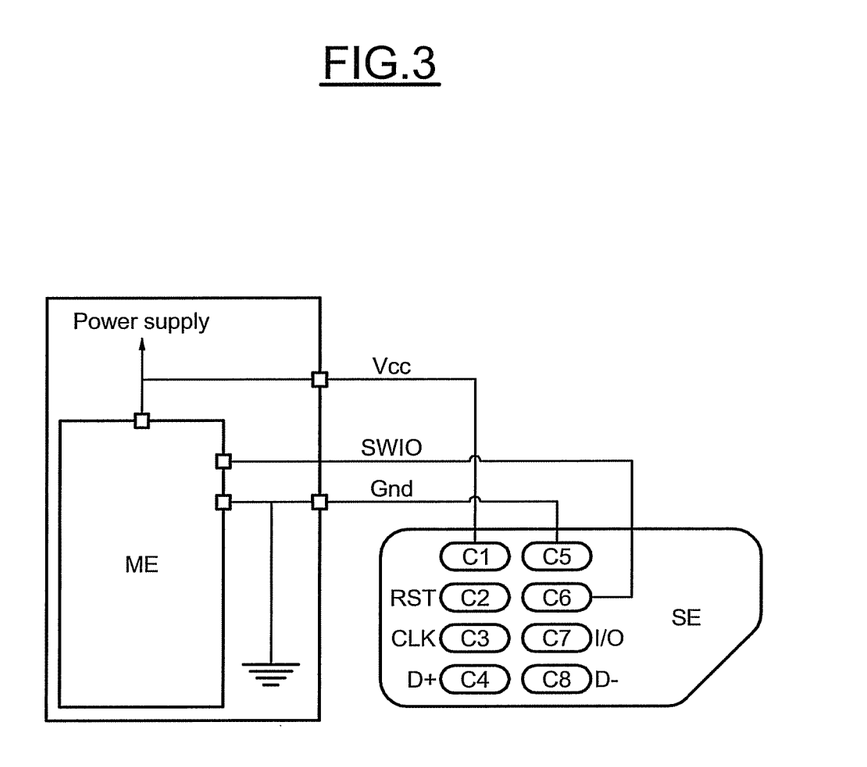

FIG. 3 represents an embodiment of the physical link between the contactless element ME and a secure element SE. More precisely, as illustrated in this figure and explained in ETSI TS 102 613, the contact C6 of the secure element is connected to the port SWIO of the contactless element ME for transmission of signal S1 and S2. The SWP protocol specified in ETSI TS 102 613 permits only the communication between the master SWP interface of the contactless element and a single slave SWP interface of a single secure element.

According to an aspect of the present disclosure, which will be now described in more detail, it may be possible to connect two or more than two auxiliary elements or secure elements SEi provided with a SWP-UICC technology to a single master SWP interface of a contactless element, for example, a NFC controller. More precisely, this may be possible, in particular, by activating at once only one slave SWP interface on the SWP link.

Activating a slave SWP interface places the slave SWP interface in an activated state. For example, activating a slave SWP interface comprises performing an activation phase during which control data is exchanged between the master interface and the slave interface. At the end of the activation phase, the master and the slave have been mutually "recognized," and the slave is ready to exchange payload information related to a particular contactless application with the contactless element. The slave interface is thus activated (or in an activated state).

Figure 4:
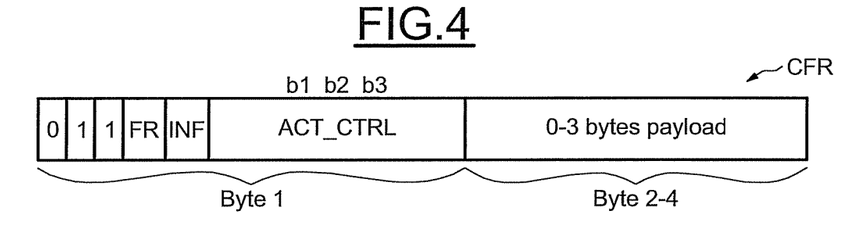
FIGS. 4-8 are example diagrams of frames used, according to the present invention.

In this respect, according to an embodiment, a new frame may be sent by the contactless element for selecting one slave SWP interface among the set of slave SWP interfaces of the secure elements connected to a same master SWP interface of the contactless element. According to ETSI TS 102 613, particular control frames, called ACT frames, are exchanged between the NFC controller ME and a secure element SE during an activation phase. The ACT frame, referenced CFR, is illustrated in FIG. 4.

More precisely, the first three bits of byte 1 of the frame CFR declare the SWP frame as an ACT frame. The FR bit indicates a corrupted previously received ACT frame (only used by the NFC controller ME). The INF bit indicates that the last payload byte contains ACT_INFORMATION field, and the ACT_CTRL bits b1 b2 b3 define the meaning of the ACT frame. After byte 1, 0-3 payload bytes follow, the content thereof depending of the content of ACT_CTRL and FR fields.

Figure 5:
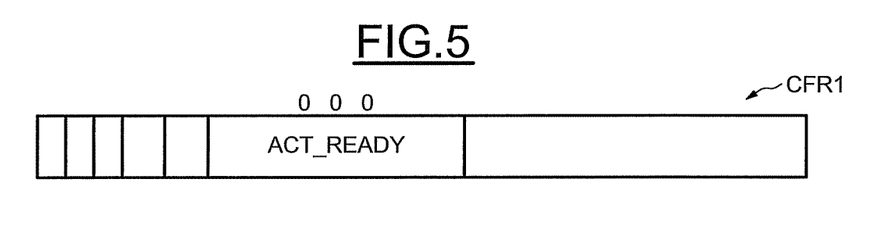
Figure 6:
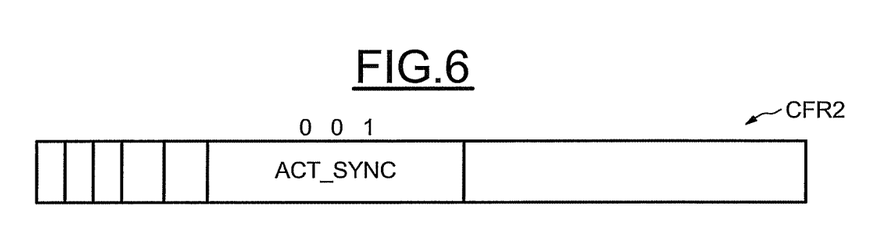
Figure 7:
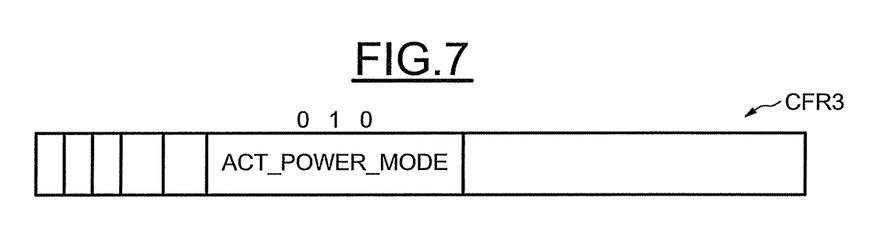

More precisely, when the bits b1 b2 b3 respectively have the binary values 000, the corresponding frame CFR1 is a so-called ACT_READY frame indicating that the secure element has been activated and is ready for exchanging information with the contactless element (FIG. 5). When the bits b1, b2, b3 respectively have the binary values 001, the corresponding frame CFR2 is a so-called ACT_SYNC frame sent by a secure element and containing the identification SYNC_ID of this secure element (FIG. 6). When the bits b1 b2 b3 respectively have the binary values 010, the corresponding frame CFR3 (FIG. 7) is a so-called ACT_POWER_MODE frame sent by the contactless element and indicating the power mode (full power or low power).

Figure 8:
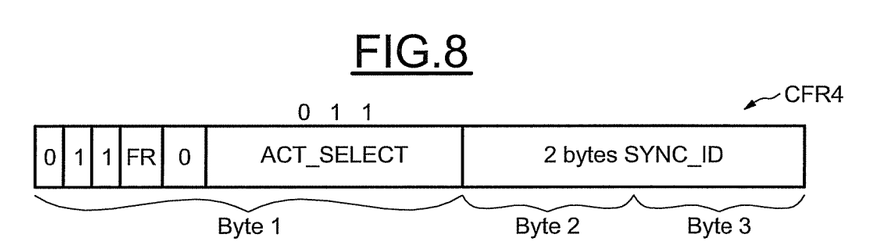

According to an embodiment of the present disclosure, a frame CFR4 (FIG. 8) is used. The bits b1 b2 b3 of this frame CFR4 respectively have the binary values 011, for example, and this frame is a so-called ACT_SELECT frame. This frame may permit to select one secure element among the set of secure elements connected to the NFC controller. And, the byte 2 and byte 3 of this frame contain the identification SYNC_ID of the slave SWP interface of the secure element to be activated.

Figure 9:
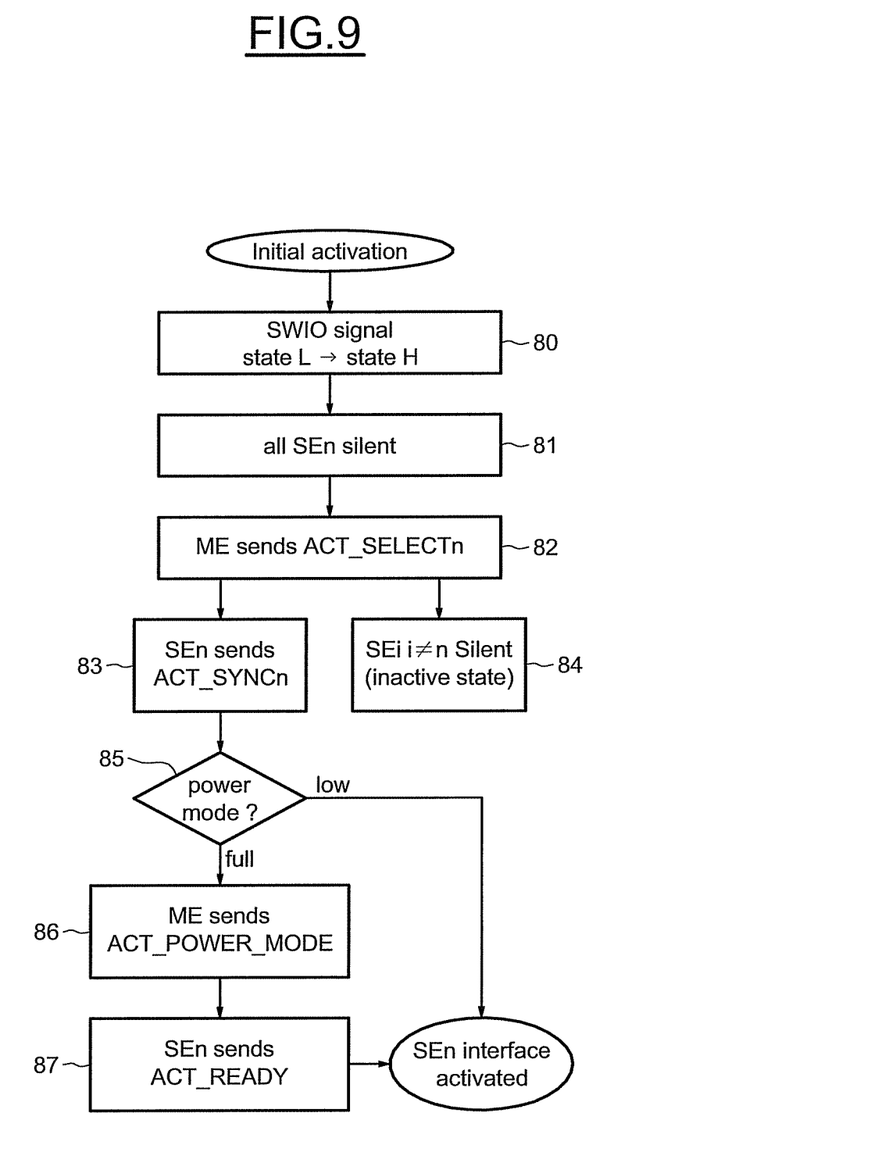
FIGS. 9-13 are example diagrams of flow-charts of several embodiments of a method, according to the present invention.

Referring now more particularly to FIG. 9, an embodiment of a method according to the present disclosure is now described. FIG. 9 is more particularly directed to an initial activation of a slave interface. And initial activation is performed, in particular, after the first powering up of the device or after a new powering up following a power interruption. First, the SWIO signal, (see FIGS. 2 and 3) which is in its low state L, is set to its high state H by the NFC controller (state 80).

In ETSI TS 102 613, a secure element, which detects such state H on its contact C6, has a predetermined duration (700 μs) for resuming the SWP link. However, according to an embodiment of the present disclosure, upon detection by each slave SWP interface of a state H on its corresponding contact C6, the corresponding auxiliary management module of the secure elements control the slave interfaces so that they remain silent (step 81). The NFC controller ME sends the ACT_SELECTn frame CFR4 (step 82) containing the identification of the secure element SEn to be activated.

Upon listening of this ACT_SELECTn frame sent by the main management module of the NFC controller, the auxiliary management module of each secure element SEi, with i different from n, controls the corresponding slave SWP interface to remain silent (step 84). The auxiliary management module of the slave interface of the secure element SEn, which is the selected secure element, sends, after having eventually resumed the SWP link, an ACT_SYNCn frame CFR2 (step 83) containing its identification SYNC_ID.

It should be noted that sending the ACT_SELECT frame CFR4 is advantageously performed within the predetermined duration (700 μs) defined by ETSI TS 102 613, whereby the selected secure element may respond by resuming and sending its ACT_SYNC frame on time with respect to the requirements of ETSI TS 102 613. Thus, this embodiment of the present disclosure may remain compliant with ETSI TS 102 613. Then, the activation process continues in a similar way as the one disclosed in ETSI TS 102 613, depending on the power mode (step 85).

More precisely, the NFC controller ME sends an ACT_POWER_MODE frame CFR3 (step 86) during a full power mode. Upon receipt of this frame CFR3, the auxiliary management module of the selected secure element SEn sends an ACT_READY frame CFR1 (step 87). The SWP interface of the secure element SEn is then considered as being activated. If the power mode is a low power mode, the interface of the selected secure element SEn is considered as being activated after step 83.

Figure 10:
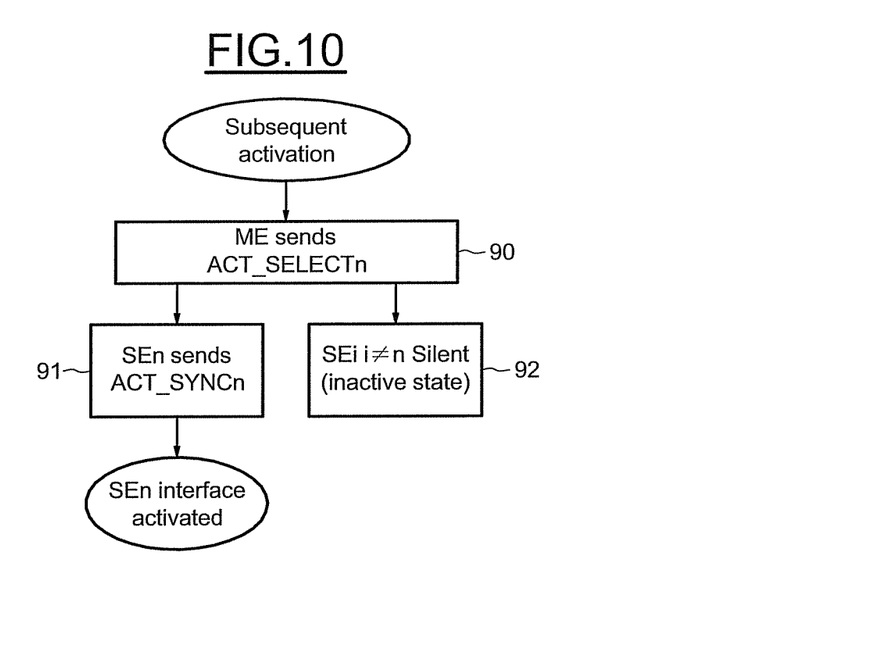

FIG. 10 illustrates a subsequent activation according to an embodiment of the present disclosure. A subsequent activation is performed, for example, after a deactivation of link LK. More precisely, as illustrated in FIG. 10, the main management module of the NFC controller ME sends the ACT_SELECTn frame containing the identification information of the slave interface of the secure element to be subsequently activated. Again, as explained above, in step 92, the auxiliary management module of the secure elements SEi, with i different from n, controls the corresponding slave interfaces so that they remain silent (for example, by keeping the S2 signal low in order to be in an inactive state). In step 91, the auxiliary management module of the secure element SEn sends on the link LK the ACT_SYNCn frame. The slave SWP interface of the secure element SEn is then considered to be subsequently activated.

Figure 11:
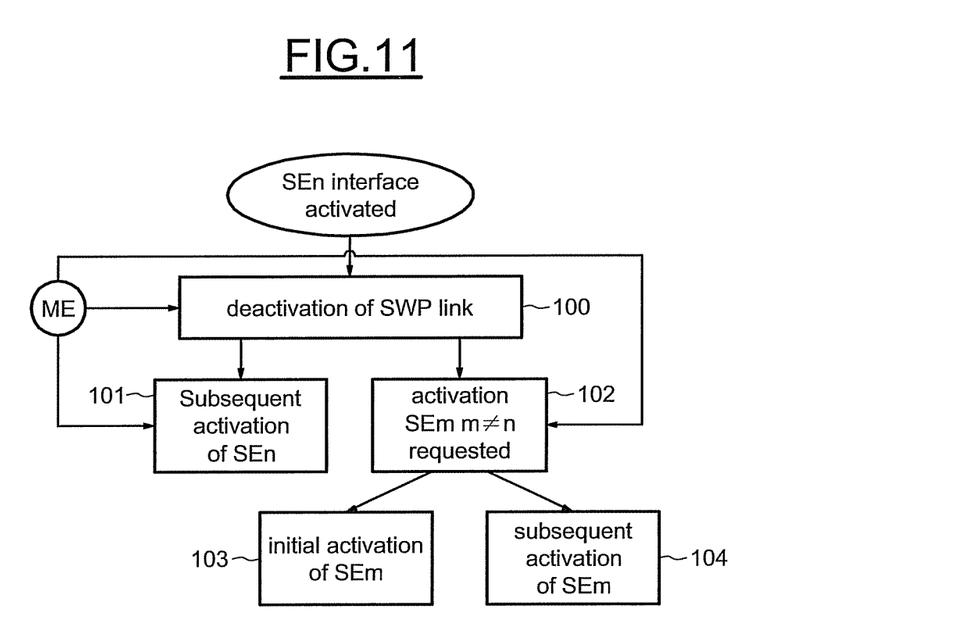

FIG. 11 illustrates other embodiments of the method according to the present disclosure. More precisely, in this figure, the SWP interface of the secure element SEn is assumed to be activated. Later, the main management module of the NFC controller ME deactivates (step 100) the secure element SEn, for example, in the manner disclosed in ETSI TS 102 613. More precisely, in this case, the signal S1 is in state L. In other words, the secure element has been deactivated (i.e. placed in an inactive state) by physically placing the SWP link LK in its deactivated state defined in ETSI 102 613.

If the secure element SEn is to be subsequently activated, then a subsequent activation of the secure element SEn is performed in step 101. If an activation of a slave interface of another secure element SEm with m different n, is requested by the main management module of the NFC controller ME, (step 102) two cases are possible. If no initial activation of secure element SEm has been previously performed, an initial activation of the slave interface of the secure element SEm is performed (step 103). If an initial activation of the slave interface of the secure element SEm has been already performed previously, then a subsequent activation of the slave interface of the secure element SEm is performed (step 104).

Figure 12:
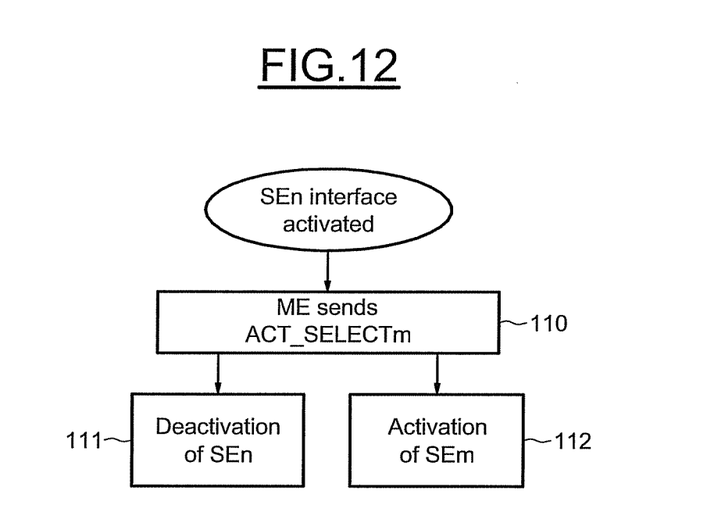

FIG. 12 illustrates another embodiment for deactivating the current activated slave interface and activating a new slave interface. More precisely, while in the embodiment illustrated in FIG. 11, the current activated slave interface was first deactivated by physically deactivating the SWP link (signal S1 at low state) before activating the new slave interface, the SWP link is not physically deactivated in the embodiment illustrated in FIG. 12.

More precisely, assuming that the interface of the secure element SEn is activated and the NFC controller ME wishes to activate the slave interface of the secure element SEm, the main management module of the NFC controller sends the ACT_SELECTm frame (step 110). The auxiliary management module of the presently activated secure element SEn interprets this frame including an identification different from the identification of the secure element SEn, as a control signal indicating that this secure element may be placed in an inactive state. In other words, the auxiliary management module of the secure element SEn forces the slave interface of the secure element SEn to remain silent although the physical link LK remains in an activated state according to ETSI TS 102 613 (step 111). And, in step 112, the auxiliary management module of the slave interface of the new secure element SEm to be activated starts the activation phase of this secure element.

Figure 13:
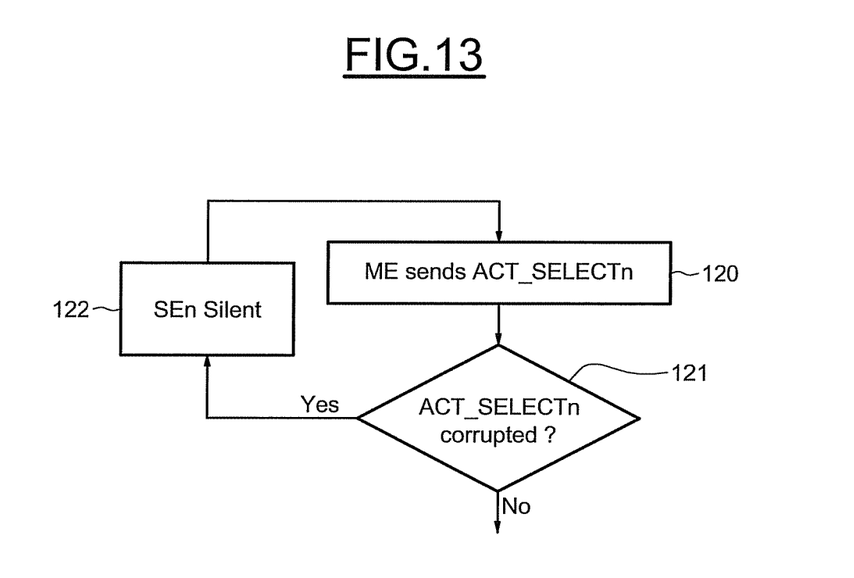

FIG. 13 illustrates the case where a corrupted selection frame ACT_SELECTn is sent (step 120 and step 121). After detection in step 121 of this corrupted frame, the auxiliary management module of the slave interface designated by this corrupted frame does not allow any response on the link LK and the secure element SEn remains silent (step 122). Thus, the main management module of the NFC controller ME sends again the ACT_SELECT frame. Of course, if no corruption is detected in step 121, the process continues normally. The main and auxiliary management module may be easily realized by software modules and/or partly by logic circuits.

Figure 14:
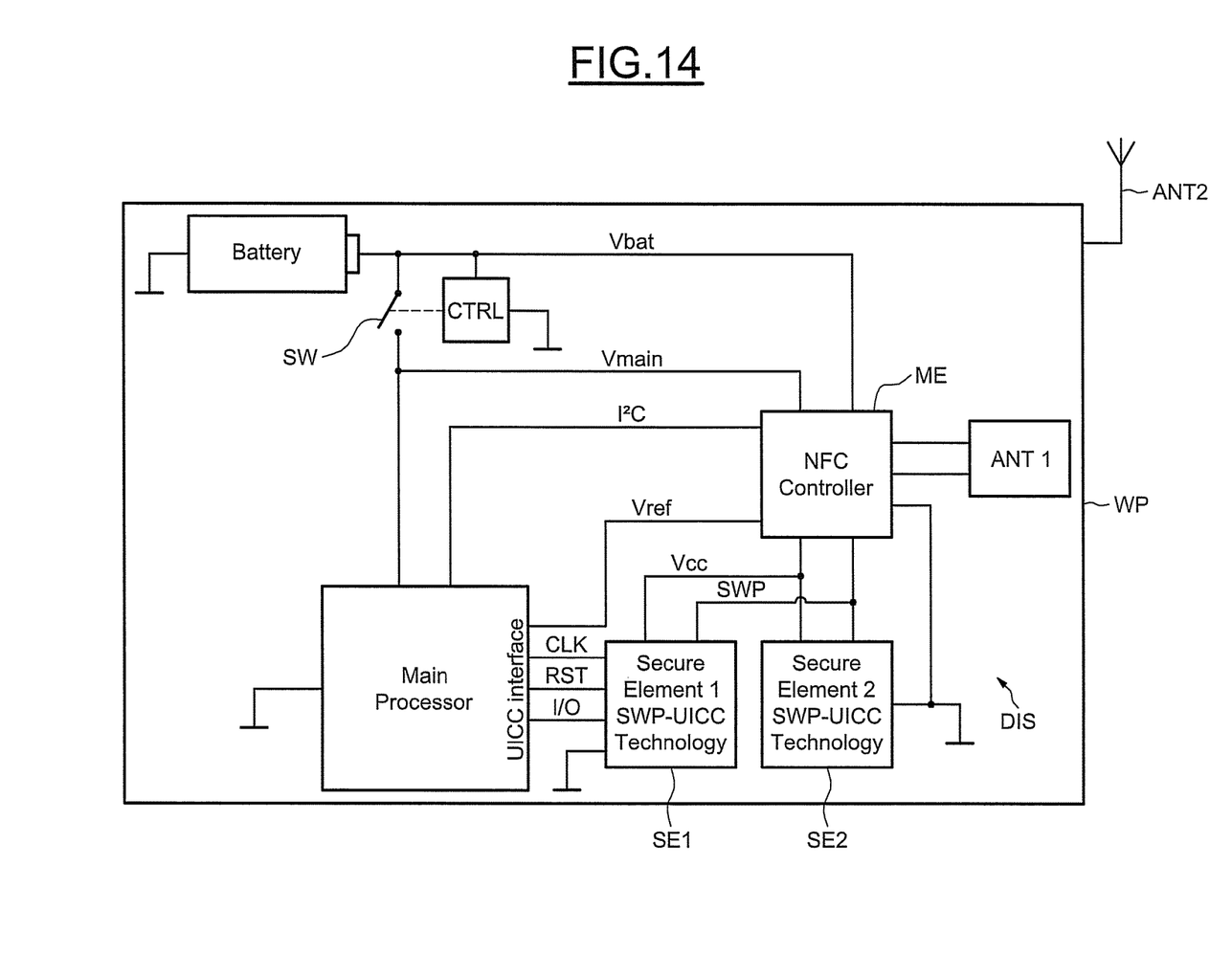
FIGS. 14 and 15 are diagrams of embodiments of a wireless apparatus, according to the present invention.

The decision to activate one or the other secure element is made, for example, taking into account the actual RF operation modes registered by the secure elements within the NFC controller and the actual identified RF operation mode identified by the antenna. As illustrated in FIG. 14 and in FIG. 15, the device DIS may be incorporated in a wireless apparatus WP, such as a mobile phone. More precisely, the mobile phone comprises a main processor (application or baseband processor) exchanging information with the secure element SE1 of the device through signal CLK, RST, I/O compliant with ETSI TS 102 221, thus permitting the telephone functionality through the antenna ANT2.

Figure 15:
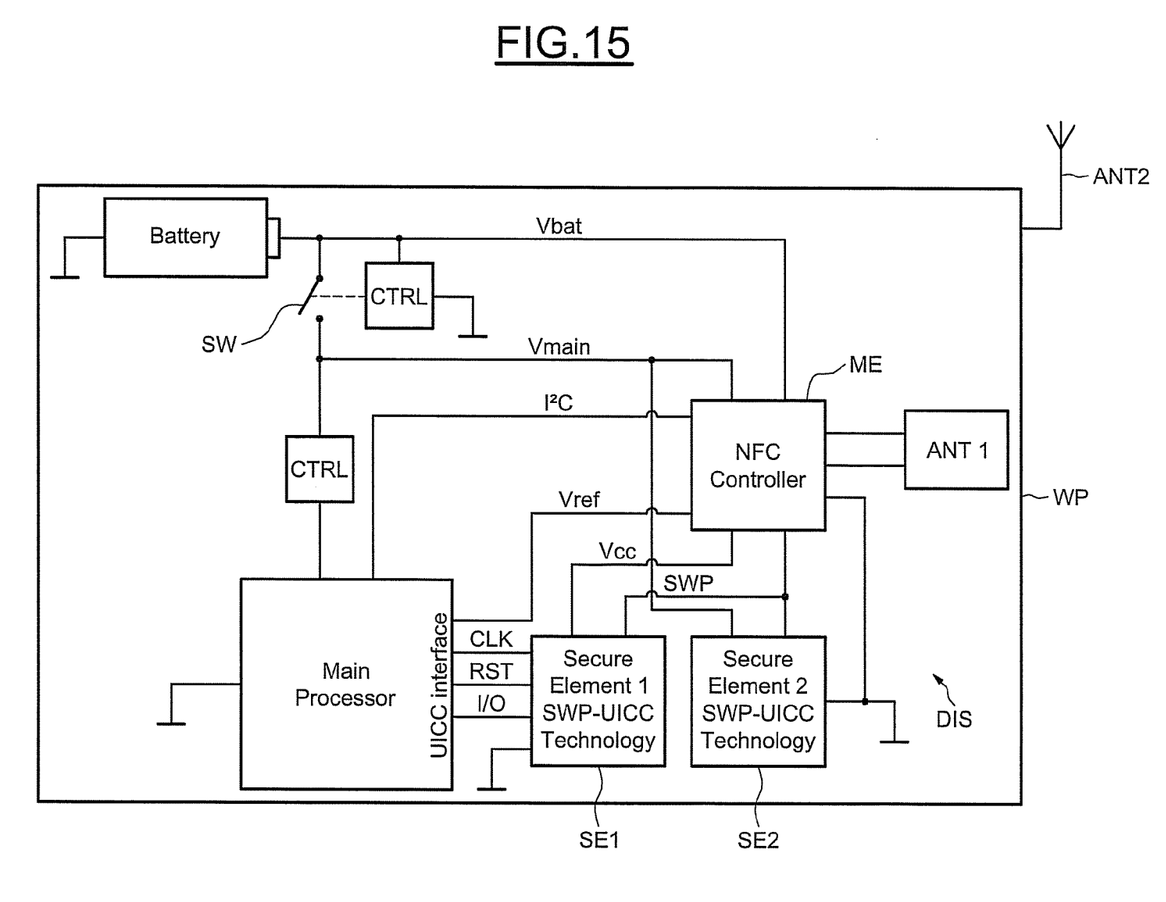

The NFC controller ME is connected to the main processor through another bus, for example, an I²C bus. In this embodiment, the power $V_{cc}$ of the two secure elements SE1, SE2 is delivered by the NFC controller. In this respect, in order to be compliant with ETSI TS 102 221, which may require the same power value between the main processor and the ETSI TS 102 221 interface of the secure SE1, an additional signal $V_{ref}$ indicating the voltage value of the main processor is delivered to the NFC controller.

The main processor is connected to the battery of the mobile phone through a controllable switch SW. A controller CTRL permits control of the switch SW and may be realized, for example, by a typical logic circuit external to this main processor. The NFC controller is powered by the voltage $V_{main}$ coming from the main processor and is also directly connected to the battery.

An antenna ANT1 permitting an NFC communication with a contactless device is coupled to the NFC controller. Information related to two different applications may be thus exchanged between the secure elements SE1 and SE2 through the NFC controller and the antenna ANT1. More precisely, information concerning telephone subscription may be loaded into secure element SE1 while secure element SE2 is used for example, for banking operations.

It is thus possible that at least one of the secure element and eventually both secure elements be totally embedded in an integrated circuit containing the NFC controller and, for example, packed with the NFC controller. In other words, at least one secure element and eventually both secure elements may be permanently incorporated in the mobile phone, i.e. without being able to be removed.

In the embodiment illustrated in FIG. 14, when the switch SW is closed, both secure elements SE1 and SE2 operate in full power mode while they operate in low power mode when the switch SW is open. In such a case, however, a minimum power $V_{bat}$ coming from the battery may be required.

In the alternative approach shown in FIG. 15, the power line of the secure element SE2 is directly connected to the main processor and also to the battery through the switch SW whereas the power line of the secure element SE1 is connected to the NFC controller. Thus, the secure element SE2 is only functional in full power mode (battery switch SW closed) while the other secure element SE1 is operational in full or low power mode. This alternative approach has the advantage to also allow an operation with one secure element in low power mode (secure element SE1) even if the battery is empty. In such a case, the power is only generated by the antenna entering a RF field from the contactless reader. Although different embodiments of the present disclosure have been disclosed with two secure elements, other embodiments including more than two secure elements connected to a same master SWP interface are also possible.

That which is claimed is:

1. A method of managing communication between a contactless element and a set of auxiliary elements, the method comprising:
   providing each auxiliary element with a slave single wire protocol (SWP) interface;
   connecting each slave SWP interface to a master SWP interface of the contactless element through a SWP link; and
   activating at least one slave SWP interface on the SWP link, the activating comprising
      each slave SWP interface, listening to the SWP link for a selection frame including an identification of the at least one slave SWP interface to be activated, and
      the at least one slave SWP interface to be activated responding to the selection frame, each other slave SWP interface remaining silent.

2. The method of claim 1 wherein activating comprises activating each slave SWP interface on the SWP link one at a time.

3. The method of claim 1 wherein the contactless element comprises a Near Field Communication (NFC) controller.

4. The method according to claim 1 further comprising maintaining a slave SWP interface different from the activated at least one slave SWP interface in an inactive state until the different slave SWP interface is activated.

5. The method according to claim 1 wherein responding to the selection frame comprises sending on the SWP link from the at least one slave SWP interface to be activated an identification control frame including identification of the at least one SWP interface to be activated.

6. The method according to claim 1 wherein the selection frame is sent within a time period after a state transition has occurred in at least one auxiliary element associated with the at least one slave SWP to be activated.

7. The method according to claim 1 wherein activating further comprises:
   after the at least one slave SWP interface to be activated has responded to the selection frame, sending from the master SWP interface to the at least one slave SWP interface to be activated, a power control frame including a power mode indication; and
   sending in response from the at least one slave SWP interface to be activated to the master SWP interface a control frame indicating the at least one SWP interface is ready for exchanging information based upon the SWP.

8. The method according to claim 1 wherein activating an other slave SWP interface comprises:
   deactivating the current at least one activated slave SWP interface; and
   then sending to the other slave SWP interface to be activated the selection frame associated with the other slave SWP interface.

9. The method according to claim 1 wherein activating an other slave SWP interface comprises sending to the other slave SWP interface to be activated the selection frame associated to the other slave SWP interface.

10. The method according to claim 1 wherein activating comprises:
    not allowing a slave SWP interface to respond to a corrupted selection frame; and
    the master SWP interface again sending the selection frame.

11. The method according to claim 1 wherein at least one auxiliary element operates in at least one of a first power mode and a second power mode, the second power mode having a power value lower than a power value of the first power mode.

12. A device comprising:
    a contactless element comprising a master single wire protocol (SWP) interface, and a main management module coupled thereto; and
    a set of auxiliary elements, each auxiliary element including a slave SWP interface coupled to the master SWP interface through a SWP link, and an auxiliary management module coupled thereto, said main management module being configured to activate at least one slave SWP interface on the SWP link, the activating comprising sending a selection frame on the SWP link including an identification of the at least one slave SWP interface to be activated;
    said auxiliary management module being configured to cause each slave SWP interface to listen to the SWP link, and cause the at least one slave SWP interface to be activated to respond to the selection frame, each other slave SWP interface remaining silent.

13. The device of claim 12 wherein said main management module is configured to activate each slave SWP interface on the SWP link one at a time.

14. The device according to claim 12 wherein said main management module is configured to maintain a slave SWP interface different from the at least one activated slave SWP interface in an inactive state until the different slave SWP interface is activated.

15. The device according to claim 12 wherein said auxiliary management module of the at least one slave SWP interface to be activated is configured to send on the SWP link an identification control frame including an identification of the at least one SWP interface to be activated.

16. The device according to claim 12 wherein said main management module is configured to send the selection frame within a time period after a state transition has occurred in at least one auxiliary element associated with the at least one slave SWP to be activated.

17. The device according to claim 12 wherein said main management module is configured to send to the at least one slave SWP interface to be activated, after the at least one slave SWP interface to be activated has responded to the selection frame, a power control frame including a power mode indication; and wherein said auxiliary management module of the at least one slave SWP interface to be activated is configured to send to the master SWP interface a control frame indicating the at least one SWP interface is ready for exchanging information according to the SWP.

18. The device according to claim 12 wherein said main management module is configured to first deactivate the current activated slave SWP interface and then send to another slave SWP interface to be activated the selection frame associated to the other slave SWP interface for activating the other slave SWP interface.

19. The device according to claim 12 wherein said main management module is configured to send to another slave SWP interface to be activated the selection frame associated to the other slave SWP interface for activating the other slave SWP interface.

20. The device according to claim 12 wherein said auxiliary management module is configured to not allow a slave SWP interface to respond to a corrupted selection frame; and wherein said main management module is configured to cause the master SWP interface to again send a selection frame.

21. The device according to claim 12 further comprising a controller configured to let each auxiliary element to operate in at least one of a first power mode and a second power mode, the second power mode having a power value lower than a power value of the first power mode.

22. The device according to claim 12 wherein said contactless element comprises a near field communication (NFC) controller; and further comprising an antenna coupled to said NFC controller.

23. A contactless element comprising:
a master single wire protocol (SWP) interface; and
a main management module coupled to said master SWP interface for communication to a set of auxiliary elements, each auxiliary element including a slave SWP interface coupled to said master SWP interface through a SWP link, and an auxiliary management module coupled thereto;
said main management module configured to activate at least one slave SWP interface on the SWP link, the activating comprising sending a selection frame on the SWP link including an identification of the at least one slave SWP interface to be activated, the auxiliary management module causing each slave SWP interface to listen to the SWP link, and causing the at least one slave SWP interface to be activated to respond to the selection frame, each other slave SWP interface remaining silent.

24. The contactless element of claim 23 wherein said main management module is configured to activate each slave SWP interface on the SWP link one at a time.

25. The contactless element according to claim 23 wherein said main management module is configured to maintain a slave SWP interface different from the at least one activated slave SWP interface in an inactive state until the different slave SWP interface is activated.

26. An auxiliary element communicating with a contactless element comprising a master single wire protocol (SWP) interface, and a main management module coupled thereto, the auxiliary element comprising:
a slave single wire protocol (SWP) interface configured to connect with the master SWP interface through a SWP link; and
an auxiliary management module coupled thereto, the main management module being configured to activate at least one slave SWP interface on the SWP link, the activating comprising sending a selection frame on the SWP link including an identification of the at least one slave SWP interface to be activated, said auxiliary management module configured to cause each slave SWP interface to listen to the SWP link, and cause the at least one slave SWP interface to be activated to respond to the selection frame, each other slave SWP interface remaining silent.

27. The auxiliary element according to claim 26 wherein said auxiliary management module is configured to send on the SWP link an identification control frame including an identification of the at least one SWP interface to be activated.

28. The auxiliary element according to claim 26 wherein said auxiliary management module is configured to send to the master SWP interface a control frame indicating the at least one SWP interface is ready for exchanging information according to the SWP.

29. The auxiliary element according to claim 26 wherein said auxiliary management module is configured to not allow a slave SWP interface to respond to a corrupted selection frame.

* * * * *